Dec. 11, 1962    J. L. A. CUPERUS ETAL    3,067,546
SLEEVE-SHAPED PLUG FOR A PIN-SHAPED FASTENING MEMBER
Filed Sept. 22, 1959
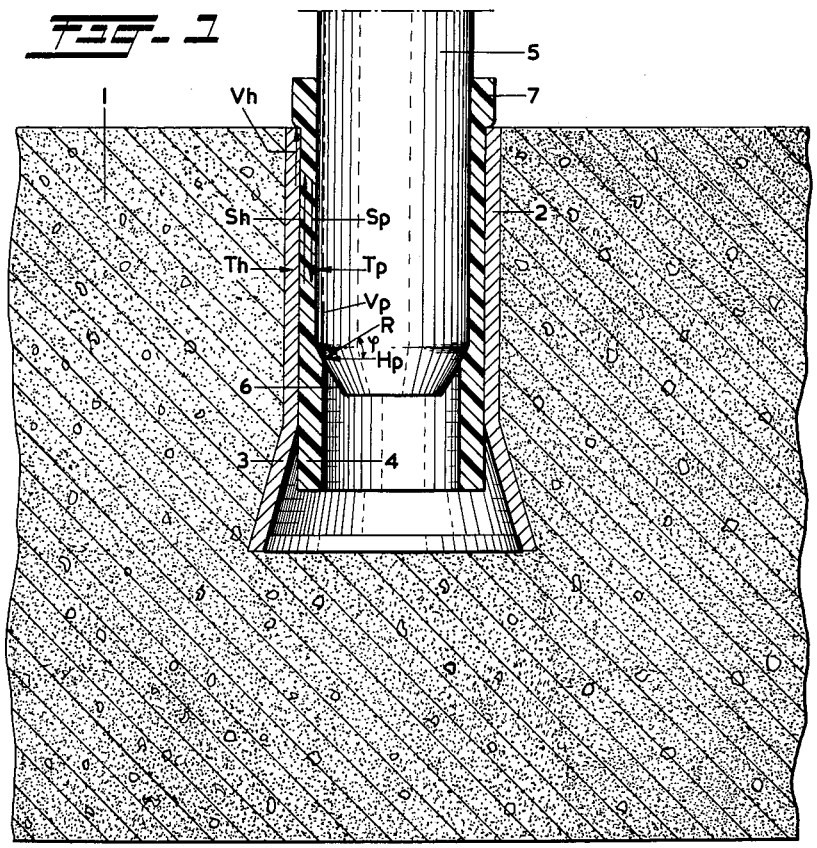
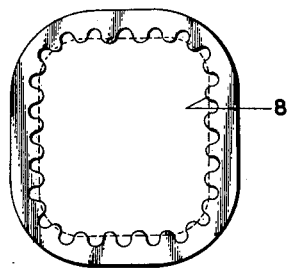
INVENTORS
JACOB LUCAS ANTHONIE CUPERUS
MACHIEL KOMMER KLEIJN
BY
ATTORNEY United States Patent Office 3,067,546
Patented Dec. 11, 1962

3,067,546
SLEEVE-SHAPED PLUG FOR A PIN-SHAPED
FASTENING MEMBER
Jacob L. A. Cuperus and Machiel K. Kleijn, Utrecht,
Netherlands, assignors to N. V. Het Spoorwegbouw-
bedrijf, Utrecht, Netherlands, a corporation of the
Netherlands
Filed Sept. 22, 1959, Ser. No. 841,523
1 Claim. (Cl. 50—268)

The invention relates to a sleeve-shaped plug, by means of which a pin-shaped fastening member can be fixed in concrete or other stony material, said plug consisting of practically non-compressible material. A plug of this kind is known from e.g. the U.S. Patent specification No. 2,172,125, according to which the plug consists of rubber which is non-compressible and very elastic. This known rubber plug is provided with internal and external longitudinal grooves, which have to provide a yielding possibilty for the material of the plug when the pin-shaped fastening member is being driven in, which in view of the non-compressibility of the rubber is necessary in order that the volume of rubber to be displaced by the pin to be driven in may be able to yield sideways, entering into these grooves, by means of elastic deformation. It is a disadvantage of such a plug consisting of rubber that it is very difficult to ensure a constant tightening force of each plug on the pin, in view of the inevitable tolerances of hole, plug and pin. Besides this known plug, plugs of fibrous material are also known, by means of which it is even less possible to ensure a given tightening force, and also plugs of a thermoplastic synthetic material, which latter plugs are employed in combination with screws, the heat generated while the screw is being screwed in resulting in such a local plasticization of the interior of the plug that a screw-thread is formed in it. However, with none of the known sleeve-shaped plugs it is possible to ensure a given tightening force without failures owing to tolerances occurring, nor can the same tightening force be ensured when after the removal of a pin a new pin is inserted into the sleeve-shaped plug.

The invention has for its object to furnish a sleeve-shaped plug which does not present the above drawbacks and this object is achieved according to the invention by the fact that the plug consists of a polyamide, such as nylon, and has a smooth closed circular, elliptic or polygonal outer cross-section. The material polyamide has the special property that this material is plastically deformed in a given stress condition and considerable plastic deformation is possible before a further increase of stress occurs, while during this plastic deformation the stress present in the material, resulting from the elasticity of the material, is maintained. This special property, which is known per se, in the case of plugs results in that—provided they have been inserted with a snug fit in a hole, which can be ensured by their being placed in the mold during the casting of the concrete—as the pin is driven in, the superfluous material will flow off as soon as the flow limit has been reached, in which case the size of the hole of the plug becomes such that it will always fit round the pin with the same stress, which stress will also be restored when the pin is extracted again and subsequently reinserted, and even when another pin of practically identical or slightly thicker cross-section is chosen for reinsertion. The elasto-plastic behaviour of the plug thus obviates any difficulties resulting from the tolerances in the dimensions of the plug and the pin, and in consequence of the wide yield-stress range of this material great differences in tolerance can be equalized. The dimensions merely have to be so chosen that the yield stress is attained with certainty. The tightening stress corresponds to the yield stress, so that, taking into account the coefficient of friction between the material of the pin, and the material of the plug respectively, and the surrounding material, it is possible to determine the load which such a fastening is able to bear.

According to the invention it is preferable to surround the plug with a metal sleeve. Such a metal sleeve can be fitted beforehand in the concrete and acts not only as a coating but also as a kind of stress sifter, because the stress produced in the plug by the pin is now absorbed, in accordance with the thickness of the wall of the metal sleeve, to a considerable extent or substantially by this sleeve, not by the concrete or other stony material. As the pin is driven into the plug, the plug has to extend slighly above the hole, so that a flange is formed, which prevents the plug being forced further into the hole. When the edge of the hole is formed by concrete, this will easily tend to be damaged, while the manufacture calls for special care. The metal sleeve completely solves this problem.

According to the invention this metal sleeve may be longer than the plug and may widen towards its lower end. This widening has a very important effect. As the pin is being driven into the plug, a tensile force is exerted on the plug, which leads to contraction of the wall of the plug. This contraction involves a decrease of the stress in the wall of the plug. When the pin is extracted, first this contraction is abolished and then the resistance to extraction increases. It has been found that this resistance only increases effectively when the pin has already been extracted from the plug over a short distance. In the case of dynamic loads this is a serious drawback, since owing to the mass inertia of the dynamic force an increase of the force of extraction has less effect after some displacement, the displacement tending to proceed under the influence of the accelerating forces. Because the sleeve widens towards its lower end, both internally and externally, it is ensured that at the end of the process of driving the pin into the plug the plug material can yield sideways, as a result of which the stress in the plug disappears and thus the contraction is abolished. In that case therefore the resistance to extraction is present at once. The external widening of the sleeve at the same time prevents its being extracted along with the pin.

In accordance with the invention the plug may be provided with ribs on the inside. This may be useful when in view of special circumstances either a long plug or a plug of a large diameter is required, since the yield stress then occurs only in the ribs and the tightening force is determined by the surface engaging the pin with the yield stress. By the reduction of this surface it is ensured that the radial stress in the material surrounding the plug or the force required to drive in or extract the pin can be reduced to a desired value or to the maximum permissible value in connection with the contemplated application of the plug.

The invention will now be elucidated further with reference to the drawing.

FIGURE 1 shows the plug according to the invention, surrounded by a metal sleeve and with a partially inserted pin, in a concrete body.

FIGURE 2 is a section through an embodiment of a plug according to the invention.

The concrete body 1 shown in FIGURE 1 is provided with a metal sleeve 2, widening conically in the lower part 3. Inserted with a snug fit in this metal sleeve is a plug 4 of polyamide, and in this plug a pin 5 is present, which thus serves as a fastening member and on which or by means of which something can be fastened. The pin 5 is bevelled at the lower end near 6, and the plug 4 extends above the hole of the metal sleeve 2, so that when the pin 5 is inserted into the plug 4, the head 7 is formed. By means of this head 7 the plug 4 is retained and does not slide into the sleeve 2.

When the pin 5 is struck into the plug, the yield stress occurs in the material of the plug, and this results in a reduction of the wall thickness of the plug with simultaneous elongation of the plug, the stress in the plug material, however, remaining constant, so that, independent of the tolerances of pin and sleeve, which only affect the quantity of material to be displaced, the tightening force exerted on the surrounding wall and on the pin is invariably constant.

The contact surface near the point of the pin is acted upon by the force R under the angle of friction $\phi$ with the normal. R has a horizontal component $H_p$ and a vertical component $V_p$. The elastically compressed polyamide exerts a tension $T_p$ on the pin and a tension $T_h$ on the sleeve. As the pin is being driven in—the plug therefore not being taken along—it absorbs the frictional force $S_p$, while in the opposite sense the frictional force $S_h$ acts between the plug and the sleeve.

The flange of the plug absorbs the vertical force $V_h$.

If we now consider the vertical equilibrium, it will be evident that $V_h$ and $V_p$ exert a tensile force on the sleeve and that $S_h$ and $S_p$ will not differ widely in magnitude, since the tensions $T_h$ and $T_p$ are practically equal, while the same coefficient of friction between steel and polyamide applies in the two cases.

This vertical tensile force leads to contraction of the wall of the plug 4, which results in a reduction of the tension, owing to which the tensions $T_h$ and $T_p$ are lower.

If the pin 5 were now to be moved in the opposite direction, after a small displacement $V_p$ would cease to apply, and accordingly so would the tensile force on the plug, and thus the contraction of the wall of the plug would cease to apply as well. If the extraction of the pin 5 is then proceeded with, the frictional resistances increase, so that the force of extraction is greater than the force required for driving in the pin.

The widening 3 of the sleeve 2 shown in FIGURE 1 has the result that when the pin 5 has reached the end of its movement, in this place the plug 4 is no longer supported by the sleeve 2, i.e. is able to yield radially, owing to which the force R becomes zero and $V_p$ ceases to apply. This results in that the contraction is eliminated, so that the tensile force required for the extraction of the pin so far driven in is at once greater.

FIGURE 2 shows a section through a plug according to the invention, which is provided on the inside with ribs 8; by the judicious choice of the form and the number of the ribs it is possible to control the tightening force completely, since it is dependent on the surface where the yield stress of the material of the plug prevails.

The circular, elliptic or polygonal outer cross-section of the plug serves to obtain a smooth surface which fits snugly in the hole destined for the plug. The polygonal cross-section is of special importance in cases where rotation of the plug has to be prevented.

What we claim is:

A fastening device securing a smooth-surfaced pin in concrete comprising a metal sleeve embedded in said concrete, said metal sleeve having an inner end and an outer end, said outer end coinciding with the surface of said concrete, said metal sleeve being a hollow cylinder throughout the major portion of its length and having an outwardly flared flange at its inner end, whereby said sleeve is anchored by said flared flange in said concrete, and a plug inserted into said metal sleeve, said plug comprising a nylon sleeve having inner and outer diameters, said outer diameter conforming substantially to the inner diameter of the cylindrical portion of said metal sleeve, a portion of said plug projecting above the outer end of said metal sleeve and the remainder of said plug being within said metal sleeve, said remainder being at least as long as the cylindrical portion of said metal sleeve, but shorter than the overall length of said metal sleeve to provide a clearance at the flared flange of said metal sleeve, and a smooth-surfaced pin inserted into said plug, said smooth-surfaced pin being longer than the cylindrical portion of said metal sleeve and having a leading end and an outer dimension larger than the inner diameter of said plug but smaller than the outer diameter of said plug whereby the projecting end of said plug is caused to deform and extend over the outer end of said metal sleeve for locking said plug against axial displacement upon insertion of said pin in said plug, said leading end of said smooth-surfaced pin deforming the nylon material of said plug such that a part of said nylon material flows in front of said leading end while the portion of said plug in contact with said cylindrical portion of said metal sleeve is under elastic tension, said flow and said elastic tension stopping as soon as said leading end reaches said flared flange of said metal sleeve.

References Cited in the file of this patent

UNITED STATES PATENTS

| 2,172,125 | Hamill | Sept. 5, 1939 |
| 2,213,818 | Krause | Sept. 3, 1940 |

FOREIGN PATENTS

| 143,334 | Switzerland | Jan. 16, 1931 |
| 804,235 | France | July 27, 1936 |
| 855,902 | Germany | Nov. 17, 1952 |
| 1,106,531 | France | July 20, 1955 |
| 1,122,536 | France | May 22, 1956 |